United States Patent [19]

Maekawa

[11] Patent Number: 4,691,475
[45] Date of Patent: Sep. 8, 1987

[54] WINDOW REGULATOR

[75] Inventor: Junichi Maekawa, Yokohama, Japan

[73] Assignee: Ohi Seisakusho Co., Ltd., Yokohama, Japan

[21] Appl. No.: 811,858

[22] Filed: Dec. 20, 1985

[30] Foreign Application Priority Data

Dec. 20, 1984 [JP] Japan .................. 59-269307

[51] Int. Cl.$^4$ .................................... E05F 11/48
[52] U.S. Cl. ...................... 49/352; 49/349; 49/360
[58] Field of Search ............. 49/352, 349, 227, 360, 49/361; 312/343, 346

[56] References Cited

U.S. PATENT DOCUMENTS

| 2,024,765 | 12/1935 | Holt et al. .................. 49/425 X |
| 2,379,923 | 7/1945 | Roethel .......................... 49/475 |
| 4,001,971 | 1/1977 | Gobush et al. ................... 49/352 |
| 4,442,632 | 4/1984 | Greco et al. ................ 49/360 X |

FOREIGN PATENT DOCUMENTS

| 2037224 | 7/1970 | Fed. Rep. of Germany . |
| 2724962 | 12/1977 | Fed. Rep. of Germany ........ 49/352 |
| 8127140 | 9/1981 | Fed. Rep. of Germany . |
| 3209052 | 9/1983 | Fed. Rep. of Germany . |
| 55-14231 | 4/1980 | Japan . |
| 576952 | 4/1946 | United Kingdom ............. 49/425 |

Primary Examiner—Philip C. Kannan
Attorney, Agent, or Firm—Schwartz, Jeffery, Schwaab, Mack, Blumenthal & Evans

[57] ABSTRACT

A window regulator includes guide rails and connecting brackets which are connected to each other to constitute a base assembly in the form of an integral framework. Other constituent parts are mounted on the base assembly so that the window regulator is in the form of a unit prior to installation thereof on a door panel.

3 Claims, 6 Drawing Figures

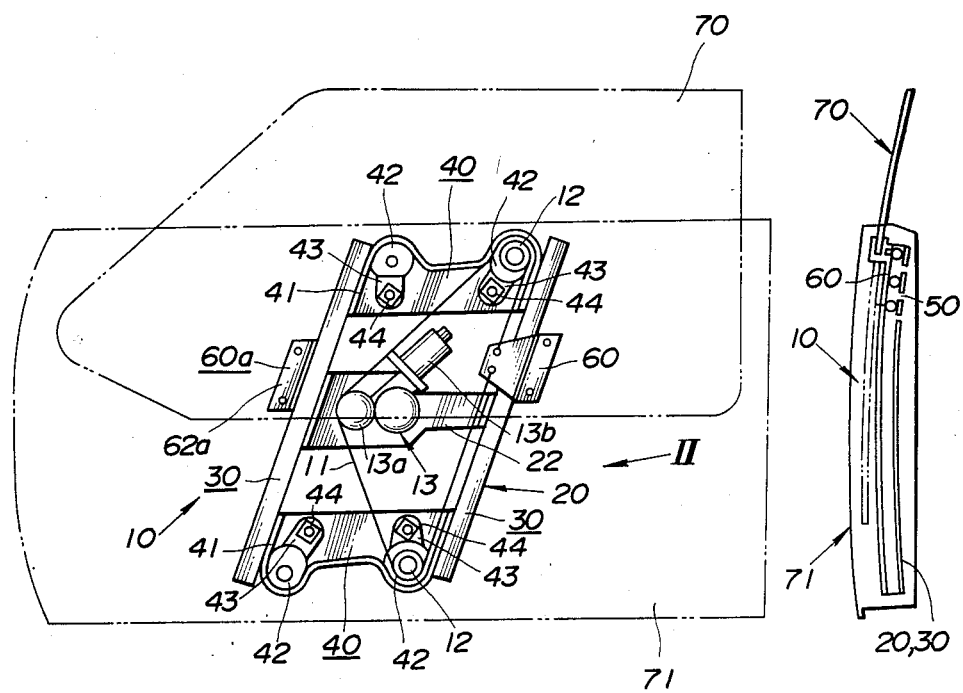

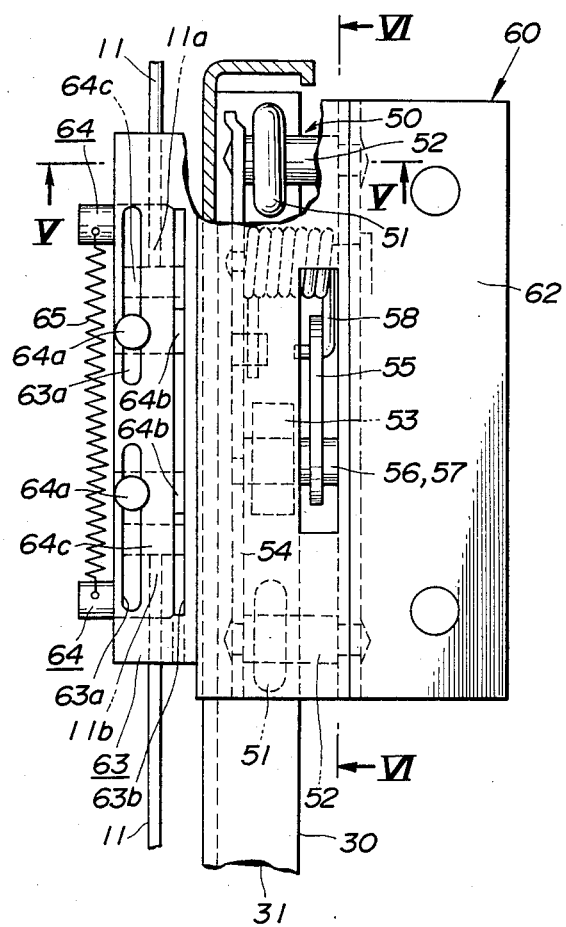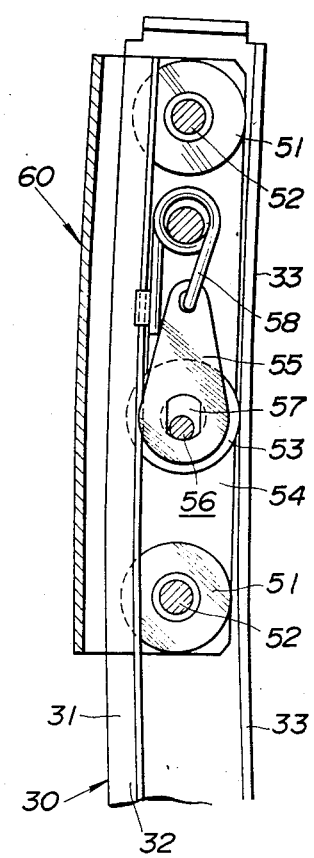

WINDOW REGULATOR

BACKGROUND OF THE INVENTION

1. Field of the Invention

The present invention relates to a window regulator for raising and lowering a window glass or window pane of an automotive vehicle door.

2. Description of the Prior Art

A prior art window regulator, as disclosed in the Japanese Patent Publication No. 55-14231, includes a pair of parallel guide rails independently secured to a door inner panel and a pair of carrier plates carrying thereon a window pane and supported by way of guide rollers on the guide rails in such a manner as to be movable upwardly and downwardly.

A disadvantage of the prior art window regulator is that its constituent parts, e.g. the guide rails and carrier plates are freely movable relative to each other prior to installation on the door inner panel and for this reason it is quite difficult to install the parts in place through an installation work which must be done in a limited space, resulting in a difficult and inefficient installation work.

SUMMARY OF THE INVENTION

In accordance with the present invention, there is provided a novel and improved window regulator which comprises a pair of parallel guide rails, a pair of connecting brackets contoured to have the same shape and symmetrically arranged to interconnect end portions of the guide rails to form an integral framework, a pair of roller units carrying thereon the window pane and movably mounted on the guide rails, and a drive unit mounted on the framework for driving one of the roller units.

The above structure is quite effective for overcoming the above noted drawbacks and shortcomings inherent in the prior art arrangement.

It is accordingly an object of the present invention to provide a novel and improved window regulator which can be installed easily and efficiently.

It is another object of the present invention to provide a novel and improved window regulator of the above described character which can be in the form of a unit prior to installation on a door panel.

It is a further object of the present invention to provide a novel and improved window regulator of the above described character of which treatment and handling prior to installation on the door panel is quite easy.

It is a still further object of the present invention to provide a novel and improved window regulator of the above described character which assures smooth movement of a window panel.

It is a yet further object of the present invention to provide a novel and improved window regulator of the above described character which can reduce an assembling expense.

BRIEF DESCRIPTION OF THE DRAWINGS

The features and advantages of the window regulator according to the present invention will become more clearly appreciated from the following description taken in conjunction with the accompanying drawings, in which:

FIG. 1 is an elevational view of a window regulator according to an embodiment of the present invention;

FIG. 2 is a view taken in the direction of the arrow II of FIG. 1;

FIG. 4 is an enlarged, partly broken away, elevational view of a carrier plate and its associated of the window regulator of FIG. 1;

FIG. 6 a sectional view taken along the line VI—VI of FIG. 4.

DETAILED DESCRIPTION OF THE PREFERRED EMBODIMENT

Figure 3:
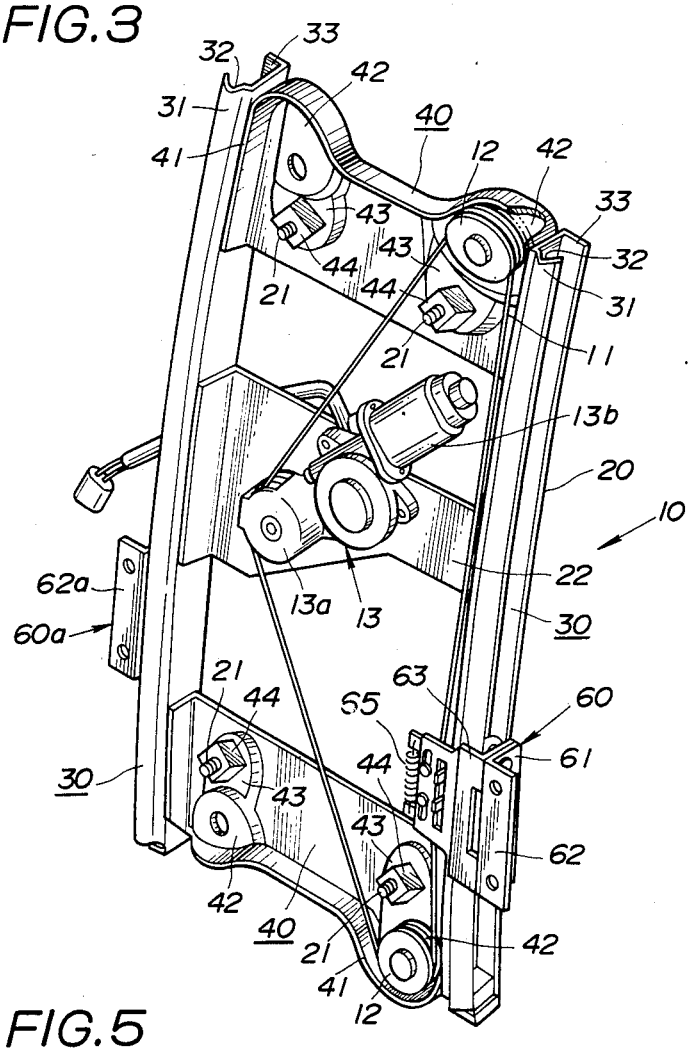
FIG. 3 is a perspective view of the window regulator of FIG. 1.
Figure 5:
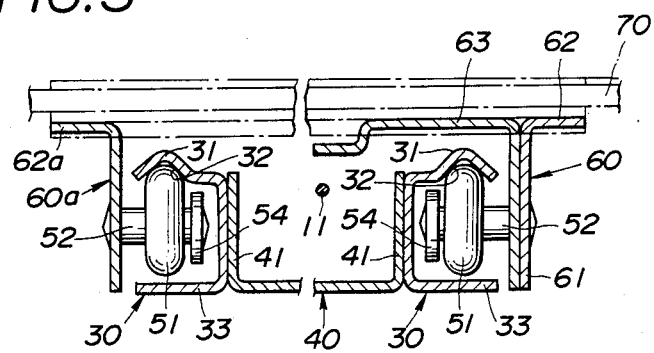
FIG. 5 is a sectional view taken along the line V—V of FIG. 4.

Referring to FIGS. 1 through 6, a window regulator is generally indicated by the reference numeral 10 and used for raising and lowering of a window pane 70 of an automotive vehicle door 71.

The window regulator 10 is provided with a base assembly 20 in the form of an integral framework and consisting of a pair of parallel guide rails 30, 30 disposed to extend in the direction of movement of the window pane 70, i.e., nearly vertically and a pair of connecting brackets 40, 40 extending horizontally between upper portions and lower portions of the guide rails 30, 30 to interconnect same, respectively. The window regulator 10 is also provided with a cable 11 which has an operative section extending alongside predetermined one, i.e., rearward one of the guide rails 30, 30 and is placed around upper and lower guide pulleys 12, 12 and a drive unit 13.

The connecting brackets 40, 40 are contoured to have substantially the same shape so that the upper one can be used as the lower one and the lower one can be used as the upper one when respectively rotated 180° in a plane including the guide rails 30, 30. Each of the connecting brackets 40, 40 is formed with a peripheral flange 41 and welded or otherwise secured thereat to the guide rails 30, 30. The peripheral flange 41 includes a portion extending between the guide rails 30, 30 and is so constructed and arranged as to increase the structural strength of the base assembly 20.

Each of the connecting bracket 40, 40 has, at the opposed ends thereof adjacent the guide rails 30, 30, pulley mounting sections 42, 42 and attaching sections 43, 43 which protrude away from an inner panel (no numeral) of the door 71 in such a manner that the pulley mounting sections 42, 42 protrude more than the attaching sections 43, 43. The upper and lower guide pulleys 12, 12 are rotatably mounted on the respective connecting brackets 40, 40 at the pulley mounting sections thereof adjacent the predetermined guide rail 30. The attaching sections 43, 43 of the connecting bracket 40 have welded or otherwise secured thereto nuts 44, 44 so that the base assembly 20 is fastened to the door inner panel 71a at two attaching sections 43, 43 of the upper connecting bracket 40 and two attaching sections 43, 43 of the lower connecting bracket 40.

Intermediate portions of the guide rails 30, 30 are connected by a supporting plate 22 on which the drive unit 13 is mounted. The drive unit 13 includes a drive pulley 13a and a drive motor 13b.

As seen from FIGS. 3 and 4, the guide rails 30, 30 are U-shaped in cross section and each include a pair of side walls 31, 33, one 31 of which is formed with a groove 32 of a V-shaped cross section and the other 33 is formed to be planar.

A pair of roller units 50, 50 of the same structure are respectively mounted on carrier plates 60, 60a which are in turn secured to the window pane 70. As seen from FIGS. 4 through 6, the rearward carrier plates 60 to which the cable 11 is secured includes a roller supporting section 61 in parallel with the guide rail 30. A pair of convexly surfaced guide rollers 51, 51 having a convex outer circumferential periphery are rotatably supported on the roller supporting section 61 at the locations adjacent the upper and lower ends thereof by means of shafts 52, 52. A flat surfaced guide roller 53 having a flat outer circumferential periphery is rotatably supported on the roller supporting section 61 at the locations between the convexly surfaced guide rollers 51, 51.

The convexly surfaced guide rollers 51, 51 are rotatably engaged in or in rolling contact with the groove 32 in the side wall 31 of the guide rail 30.

The flat surfaced guide roller 53 is rotatably engaged with or in rolling contact with the side wall 33 and rotatably mounted on an eccentric portion 57 of a shaft 56 which is in turn rotatably mounted at the opposite ends thereof on the roller supporting section 61 and a planar stopper plate 54. The stopper plate 54 is secured to the carrier plate 60 by means of the shafts 52, 52.

A pivotal lever 55 is mounted at an end thereof on the eccentric portion 57 of the shaft 56 to rotate together therewith and connected at the other end thereof to an end of a coil spring 58 placed around a shaft (no numeral) extending between the roller supporting section 61 and the stopper plate 54. The other end of the coil spring 58 is abuttingly engaged with a stopper (no numeral) integrally provided to The stopper plate 54 in such a manner as to be preloaded to urge the pivotal lever 55 in the clockwise direction in FIG. 6, i.e., to urge the flat surfaced guide roller 53 toward the flat surfaced side wall 33. In the above manner, the roller unit 50 is movably engaged with or in rolling contact with the guide rail 30. The other carrier plate 60a is provided with the roller unit 50 in the similar manner.

The carrier plate 60 has a window pane supporting section 62 extending consecutively from the roller supporting section 61 and carries at the supporting section 62 the window pane 70 to move together therewith. A cable connecting plate 63 is attached to the carrier plate 60 and extends therefrom toward the cable 11. The cable connecting plate 63 is formed with elongated openings 63a, 63a, 63b elongated in parallel with the guide rail 30. A pair of sliding pins 64a, 64a are slidably supported in the openings 63a, 63a and carries thereon slides plates 64, 64, respectively. The slide plates 64, 64 are respectively formed with guide sections 64b, 64b which are received in the opening 64b to cooperate with the sliding pins 64a, 64a to guide movement of the slide plates 64, 64. The slide plates 64, 64 are interconnected by a coil spring 65 and urged thereby toward each other.

The upper and lower slide plates 64, 64 are connected by the end 11a of the cable 11 extending downwardly from the upper pulley 12 and the end 11b of the cable 11 extending upwardly from the lower pulley 12 by means of trunnion pins 64c, 64c, respectively.

The carrier plate 60a has attached thereto a cable connecting plate 62a which carries thereon the window pane 70.

In assembly, since the connecting brackets 40, 40 are the same constituent parts having the same shape, they are arranged symmetrically and are welded or otherwise secured at the opposite ends thereof to the upper end portions and lower end portions of the guide rails 30, 30 to form the base assembly 20. Then, the remaining constituent parts such as the pulleys 12, 12, drive unit 13, roller units 50, 50, wire 11, etc. are installed on the base assembly 20. The window regulator 10 is thus formed into a unit prior to installation on the automotive vehicle door 71.

In installation, the window regulator 10 in the form of a unit is disposed within the door 71 and installed roughly in place by means of bolts 21 screwed into the nuts 44. Adjustment is then made to the window regulator 10 so that the window regulator is installed precisely in place to allow the window pane 70 to be movable upwardly and downwardly smoothly. In this instance, it is to be noted that installation of the window regulator 10 can be done with ease since the window regulator 10 is in the form of a unit and can be treated and handled quite easily.

In operation, the drive motor 13b of the drive unit 13 is attached to cause the drive pulley 13a to rotate. Rotation of the drive pulley 13a causes the cable 11 to move longitudinally thereof, thus causing the carrier plate 60 to which the cable 11 is connected to move upwardly and downwardly. By this, the window pane 70 is caused to move upwardly and downwardly to close and open the window of the door 71. Upon the upward and downward movement of the window pane 70, slack arising in the slack side part of the cable 11 is taken up by the spring 65 interconnecting the slide plates 64, 64. Further, the roller units 50, 50 are caused to move upwardly and downwardly being guided by the guide rails 30, 30. In this connection, since the flat surfaced guide roller 53 is urged against the side wall 33 under the bias of the spring 58, the convexly surfaced guide rollers 51, 51 are urged away from the flat surfaced guide roller 53 to fittingly engage in the groove 32.

In the above, it is to be noted that the pivotal lever 55 is mounted on the eccentric portion 57 of the shaft 56 to rotate together therewith and constructed and arranged so that the bias of the spring 58 is amplified by the effect of leverage, thus making it possible to efficiently transmit the bias of the spring 58 to the flat surfaced guide roller 53. Accordingly, with the small-sized spring 58, the roller units 50, 50 are assuredly engaged with the guide rails 30, 30 without any play therebetween even if the grooves 32, 32 have any dimensional errors in the direction transversal to the side walls 31, 31.

It is further to be noted that the groove 32 is formed in one side wall 31 only and the other side wall 33 is formed to be planar, whereby all of the rollers 51, 53 can fittingly engage the side walls 31, 31 without any play therebetween even if the groove 32 has any dimensional errors in the direction parallel to the side wall 31.

While the present invention has been described and shown as an application to a specific window regulator, it is not limitative. For example, the roller units may be replaced by other reciprocating units having synthetic resinous sliding members that slide on guide rails.

What is claimed is:

1. A window regulator for raising and lowering a window pane of an automotive vehicle door, comprising:
    a pair of guide rails;
    a pair of connecting brackets contoured to have the same shape and symmetrically arranged to interconnect the end portions of said guid rails to form an integral framework, said connecting brackets having flanged peripheries extending in a direction tranverse to said guide rails;

a pair of reciprocating units which comprise roller units carrying thereon the window pane and movably mounted on said guide rails;

pair of guide members respectively mounted on said connecting brackets and a cable placed around said guide members and having opposite ends connected to one of said roller units; and a drive unit mounted on said framework and operatively connected to said reciprocating units for driving said reciprocating units, wherein said connecting brackets each have two guide member mounting sections so that one of said connecting brackets mounts one of said guide members at one of said guide member mounting sections and the other of said connecting brackets mounts the other of said guide members at the other of said guide member mounting sections.

2. A window regulator as set forth in claim 1, further comprising a supporting plate interconnecting intermediate portions of said guide rails, said drive unit being mounted on said supporting plate.

3. A window regulator as set forth in claim 2, further comprising a pair of carrier plates through which the window pane is attached to said roller units, said opposite ends of said cable being movably mounted on one of said carrier plates and urged toward each other by spring means to take up slack of said cable.

* * * * *